No. 809,443. PATENTED JAN. 9, 1906.
R. HOHNBACH, Jr. & W. LEITEL.
DOUGH DIVIDING AND SCALING MACHINE.
APPLICATION FILED AUG. 24, 1904.

Witnesses.
Aaron E. Miller
Geo. W. Hamy

Inventors.
Robert Hohnbach Jr.
William Leitel

UNITED STATES PATENT OFFICE.

ROBERT HOHNBACH, JR., AND WILLIAM LEITEL, OF JOLIET, ILLINOIS.

DOUGH DIVIDING AND SCALING MACHINE.

No. 809,443.  Specification of Letters Patent.  Patented Jan. 9, 1906.

Application filed August 24, 1904. Serial No. 222,032.

*To all whom it may concern:*

Be it known that we, ROBERT HOHNBACH, Jr., and WILLIAM LEITEL, citizens of the United States, residing at Joliet, in the county of Will and State of Illinois, have invented a new and useful Dough Dividing and Scaling Machine, of which the following is a specification.

Our invention relates to improvements in machines for scaling dough, the object being to detach any desired weight, to secure practically exact uniformity in the weight of successive quantities of dough being detached by the different adjustments of the machine, this by entirely avoiding all the abrasions, adhesions, and irregular compressions incidental to measuring dough by forcing it into and out of receptacles, or other similar methods, and to avoid injuring dough in the process of measuring it, and to indicate on a scale the weight of dough being detached by different adjustments of the machine. We attain these objects by the mechanism illustrated in the accompanying drawings, in which—

Figure 2:
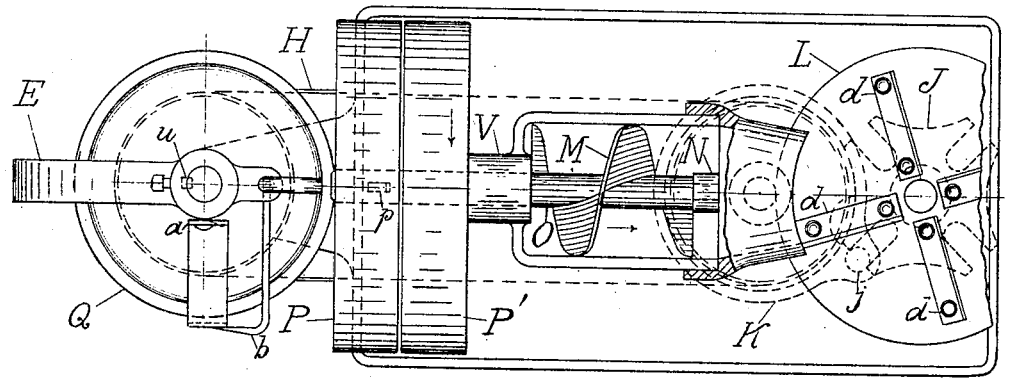
Figure 1:
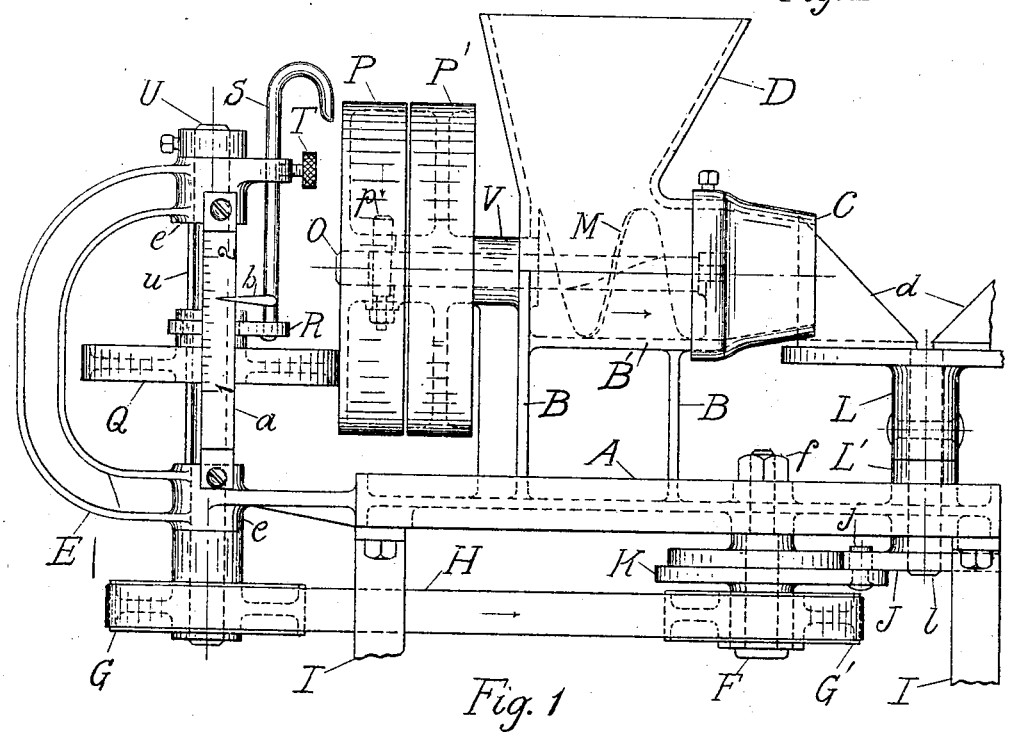

Figure 1 is a side elevation, and Fig. 2 is a plan view with hopper D removed.

Bed-plate A, standards B B, trough B', bearings V and N, yoke E, and bearings e e form one casting constituting the framework.

I I are supports for the framework.

P is a disk pulley by which motion is imparted to the machine, and this pulley is keyed by key p to shaft O. By means of key p pulley P can be shifted on the shaft O, so that the desired pressure against friction-wheel Q can be secured.

P' is a pulley to stop the motion of the machine, and said pulley runs loosely on shaft O. Shaft O journals into bearings V and N.

M is a spiral conveyer which is secured to shaft O and conveys dough out of hopper D and through spout C. Standards B B support trough B', in which conveyer M revolves. On this trough hopper D is secured.

By rotation of pulley P friction-wheel Q is revolved, the latter revolving shaft U by means of feather-key u. Friction-wheel Q can be moved up or down on shaft U and held in any desired position against the face of pulley P by rod S, the latter movable through the lug of upper bearing e and riveted to collar R, which fits loosely on the hub of friction-wheel Q, thumb-screw T holding wheel Q and rod S in any desired position. Shaft U journals in bearings e e and turns crown-pulley G, which by belt H turns crown-pulley G'. (Two pairs of miter-gears connected by a shaft journaling in proper bearings attached to the bed-plate A can be substituted for pulley G, belt H, and pulley G'.) Pulley G' is keyed onto the hub of gear K, which runs loosely on stud F, which is bolted to bed-plate A by means of nut f. Motion is imparted to intermittent gear J by means of pin j, riveted to gear K. The motion of gear J is transmitted to table L, the latter and gear J being keyed to shaft l, which journals in bearing L'. Therefore the motion of cutters d d, fastened to the face of table L, is such that they make one-quarter revolution to one revolution of gear K, and each cutter shears off the desired quantity of dough as the cutter passes over the opening of spout C. The number of cuttings per revolution of the table can be varied by change of gears. The weight of pieces of dough cut off is indicated on a scale a by pointer b, the graduations on scale a representing pounds and ounces having been determined by experiment. As the friction-wheel Q receives motion from the pulley P and the relative motions of pulley P and wheel Q depend on their relative positions, it is obvious that the position of the pointer or index b with respect to the scale-plate a will indicate the weight of each portion of dough divided by the cutters, the number of revolutions of the pulley P and the friction-wheel Q being adjustable with respect to the pulley P.

What we claim as our invention, and desire to secure by Letters Patent, is—

1. In a dough dividing and scaling machine, the combination with a receptacle for dough having an outlet at one end for the passage of dough and having a spiral conveyer and conveyer-shaft, mounted on suitable bearings, of a power-pulley mounted on said shaft, of a frictional wheel in peripheral contact with the face of said power-pulley, a fixed shaft on which said frictional wheel is adjustably mounted, a dough cutter or divider, consisting of a horizontally and intermittently rotating table mounted on a vertical shaft, and having radially-arranged cutting knives or wires, in such a position as to sever from the mass of dough issuing from the said receptacle, predetermined weights and quantities of dough, means for communicating intermittent motion to said table from and through the medium of said frictional wheel, an index or pointer carried by said frictional wheel, a graduated scale-plate adjacent to said index, and means for adjusting said frictional wheel, radially with relation to the said power-pulley, whereby the speed of the frictional wheel may be varied, the desired weight of portions of dough indicated, and the corresponding portions of dough severed from the mass, all substantially as set forth.

2. In a dough dividing and scaling machine, the combination with intermittently-operating cutters, mounted on a vertical axis and adapted to travel horizontally and to cut portions of dough from a constantly-feeding mass, of means for automatically regulating the amount of dough cut at each motion of the cutters, and means for indicating the weight of each portion of dough so cut, all substantially as set forth.

In testimony whereof we have signed our names to this specification in the presence of two subscribing witnesses.

ROBERT HOHNBACH, Jr.
WILLIAM LEITEL.

Witnesses:
AARON E. MILLER,
GEO. W. HENRY.